US011775278B1

(12) United States Patent
Deshmukh et al.

(10) Patent No.: US 11,775,278 B1
(45) Date of Patent: Oct. 3, 2023

(54) SYSTEMS AND METHODS FOR AUTOMATED TRAFFIC CONTROL UPDATE

(71) Applicant: Union Pacific Railroad Company, Omaha, NE (US)

(72) Inventors: Supriya Deshmukh, Omaha, NE (US); Randy Groh, Omaha, NE (US); Tyler Chrisman, Elkhorn, NE (US); Jonathan Rodriguez, San Antonio, TX (US); Kelechi Nwogu, Austin, TX (US); Evan Freilich, Omaha, NE (US)

(73) Assignee: Union Pacific Railroad Company, Omaha, NE (US)

( * ) Notice: Subject to any disclaimer, the term of this patent is extended or adjusted under 35 U.S.C. 154(b) by 28 days.

(21) Appl. No.: 17/529,480

(22) Filed: Nov. 18, 2021

Related U.S. Application Data

(60) Provisional application No. 63/115,336, filed on Nov. 18, 2020.

(51) Int. Cl.
*G06F 8/65* (2018.01)
*G08G 9/00* (2006.01)

(52) U.S. Cl.
CPC ........ *G06F 8/65* (2013.01); *G08G 9/00* (2013.01)

(58) Field of Classification Search
None
See application file for complete search history.

(56) References Cited

U.S. PATENT DOCUMENTS

| | | | |
|---|---|---|---|
| 8,295,059 B1* | 10/2012 | Conroy | G08G 1/095 361/796 |
| 11,646,244 B2* | 5/2023 | Klein | H01R 13/73 439/55 |
| 2014/0304695 A1* | 10/2014 | Gambardella | G06F 9/541 717/168 |
| 2016/0086391 A1* | 3/2016 | Ricci | G06Q 30/06 701/29.3 |
| 2018/0109975 A1* | 4/2018 | Kalliola | H04W 24/04 |
| 2021/0311713 A1* | 10/2021 | De Meulder | B64F 5/60 |
| 2022/0108049 A1* | 4/2022 | Letwin | G06F 30/20 |

* cited by examiner

*Primary Examiner* — Philip Wang
(74) *Attorney, Agent, or Firm* — Daniel J. Honz; Advent, LLP

(57) ABSTRACT

Systems and methods for systems and methods for automatically managing updates to traffic control devices that are determined to not impact traffic flows during the update process are described. A system embodiment includes, but is not limited to, a processor; a vehicle data source; a traffic control device monitor; a traffic control device location source; an update distribution system; at least one traffic control device communicatively coupled with the update distribution system; and a device notification system, wherein the processor is configured to analyze data received from at least one of the vehicle data source, the traffic control device monitor, and the traffic control device location source and determine whether the at least one traffic control device can switch to an updated traffic control device component from the update distribution system without impacting traffic flow of vehicles past the least one traffic control device.

20 Claims, 4 Drawing Sheets

SYSTEMS AND METHODS FOR AUTOMATED TRAFFIC CONTROL UPDATE

CROSS-REFERENCE TO RELATED APPLICATIONS

The present application claims the benefit of 35 U.S.C. § 119(e) of U.S. Provisional Application Ser. No. 63/115,336, filed Nov. 18, 2020, and titled "SYSTEMS AND METHODS FOR AUTOMATED TRAFFIC CONTROL UPDATE." U.S. Provisional Application Ser. No. 63/115,336 is herein incorporated by reference in its entirety.

BACKGROUND

Traffic control systems operate to provide data to vehicle systems and/or operators of vehicle systems. The data can relate to functionality or operational control of vehicles, conditions of the surrounding environment and associated infrastructure, or other information that can affect traffic flow. The data can be used to provide manual or automated control of vehicle functionality, such as directionality, speed, and braking.

SUMMARY

Systems and methods for systems and methods for automatically managing updates to traffic control devices that are determined to not impact traffic flows during the update process are described. In an aspect, a system embodiment includes, but is not limited to, at least one traffic control device configured to control at least one aspect of travel of a vehicle traversing a travel path, the at least one traffic control device having an operational area intercepting at least a portion of the travel path, the at least one traffic control device including at least one traffic control device component stored in a memory device operable to provide functionality to the at least one traffic control device; and a system update controller communicatively coupled with the at least one traffic control device, the system update controller including at least one processor operable to receive an updated traffic control device component, determine whether the at least one traffic control device component stored in the memory device of the at least one traffic control device is an outdated version of the updated traffic control device component, and when it is determined that the at least one traffic control device component stored in the memory device of the at least one traffic control device is an outdated version of the updated traffic control device component, determine whether the at least one traffic control device can implement the updated traffic control device component prior to arrival of the vehicle at a point of the travel path that intercepts the operational area.

In an aspect, a system embodiment includes, but is not limited to, a plurality of traffic control devices configured to control at least one aspect of travel of a vehicle traversing a travel path, each traffic control device of the plurality of traffic control devices including at least one traffic control device component stored in a memory device operable to provide functionality to the traffic control device; an update distribution system communicatively coupled with the plurality of traffic control device, the update distribution system configured to generate a notification of availability of an updated traffic control device component, transmit the notification to the plurality of traffic control devices, and generate a list of candidate traffic control devices from the plurality of traffic control devices that are ready to implement the updated traffic control device component; and a processor communicatively coupled with the plurality of traffic control devices and the update distribution system, the processor configured to receive the list of candidate traffic control devices, determine which traffic control devices from the list of traffic control devices can implement the updated traffic control device component prior to arrival of the vehicle at a point of the travel path that intercepts an operational area of a traffic control device from the list of traffic control devices, and generate a list of the traffic control devices that can implement the updated traffic control device component prior to arrival of the vehicle at the point of the travel path that are authorized to implement the updated traffic control device component, wherein the traffic control devices on the list of the traffic control devices that can implement the updated traffic control device component are configured to implement the updated traffic control device component subsequent to authorization from the processor.

In an aspect, a method embodiment includes, but is not limited to, generating, via an update distribution system, a notification of availability of an updated traffic control device component for at least one traffic control device component stored in a memory device of a plurality of traffic control devices configured to control at least one aspect of travel of a vehicle traversing a travel path; transmitting the notification to the plurality of traffic control devices; generating a list of candidate traffic control devices from the plurality of traffic control devices that are ready to implement the updated traffic control device component; receiving, via a computer processor, the list of candidate traffic control devices determining, via the computer processor, which traffic control devices from the list of traffic control devices can implement the updated traffic control device component prior to arrival of the vehicle at a point of the travel path that intercepts an operational area of a traffic control device from the list of traffic control devices; generating a list of the traffic control devices that can implement the updated traffic control device component prior to arrival of the vehicle at the point of the travel path that are authorized to implement the updated traffic control device component; and implementing the updated traffic control device component on the traffic control devices on the list of the traffic control devices that can implement the updated traffic control device component prior to arrival of the vehicle at the point of the travel path subsequent to authorization from the processor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. In the figures, the use of the same reference numbers in different instances in the description and the figures may indicate similar or identical items.

DETAILED DESCRIPTION

Overview

Figure 1:
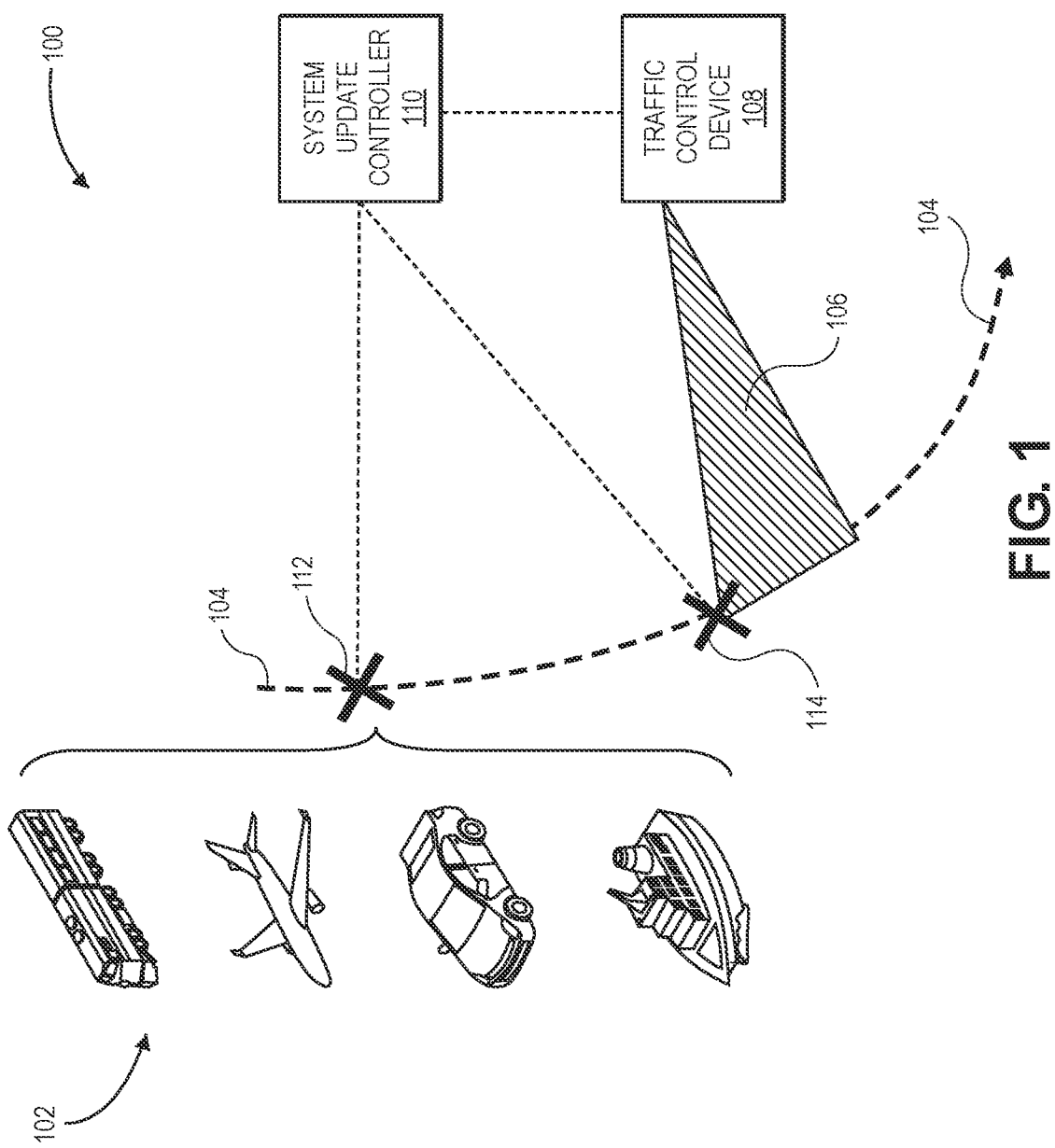
FIG. 1 is a schematic diagram of a traffic control update system for automatically determining traffic control devices suitable for switching to an updated traffic control device component based on proximity to vehicles that utilize the traffic control system in accordance with example implementations of the present disclosure.

Traffic control systems provide critical information to travel and freight transportation networks. The information can be used by components of the traffic control systems to provide automated control of aspects of the vehicles that rely on the traffic control systems. For example, wayside antennas, traffic signals, and other components can relay information to operators of the vehicles or to automated controllers associated with the vehicles based on information collected from a network of communication sources. Such information can be associated with any number of vehicles operating within the area managed by the traffic control system, environmental conditions within the area managed by the traffic control system, or the like, and can include, but is not limited to, data associated with vehicle position, vehicle speed, vehicle type, vehicle size/weight, vehicle authorizations, network component status, network hardware, firmware, and software statuses, terrain conditions, weather conditions, traffic infrastructure conditions (e.g., bridge status, road status, rail status, airfield status, canal status, dock status, etc.), and combinations thereof. An example traffic control system can be utilized to control traffic throughput of trains operating on railroad networks. The traffic control system can integrate components utilizing various communication platforms, such as a global navigation satellite system (GNSS) (e.g., the Global Positioning System (GPS)), Wi-Fi, radio, cellular, antennae, base stations, and the like, to control the traffic of trains on the rails to mitigate accidents associated with train-to-train collisions, derailments caused by excessive speed, unauthorized entry of trains into construction or maintenance zones, misaligned track switches, and the like. For instance, the traffic control system can provide messages to locomotive engineers (e.g., to slow down) and can automatically engage brakes on the train if the engineer does not respond in a timely manner or if the train is otherwise operating in an unsafe condition.

With multiple interacting system components and potential communication types/protocols, traffic control systems may rely on software or firmware updates to ensure that system components are equipped with any changes distributed throughout the traffic control system. For example, updates can ensure that system components are coordinated to interact with each other, can ensure that system components have new or enhanced operational capabilities, can address errors, bugs, or other detrimental conditions, or the like. However, updating software or firmware components of the traffic control system can impair functionality of the system or portions thereof while particular system components implement the update, which can impede traffic flow of the vehicles relying on the traffic control system or require more manual aspects of vehicle control. If a vehicle is within the operational range of a system component that is undergoing an update, the system may not function to manage control of the vehicle due to an outage of the system component caused by installing or otherwise implementing the update. This can pose a safety issue or otherwise cause traffic issues by failing to recognize the presence of the vehicle, failing to control certain aspects of the vehicle, or other potential safety or traffic issue. For instance, if a train is within range of a wayside signal antenna while the wayside signal antenna is updating, the traffic control system may be unable to broadcast messages to the locomotive engineers, may be unable to assume automatic control of the brakes, or may otherwise require manual control of the train, which can involve a substantial distance to stop the train dependent on factors such as train length, train speed, rail conditions, engineer attentiveness, etc. Similarly, if a traffic light at a street intersection undergoes a system update while roadway vehicles are nearby, the vehicles may require manual operation and driver attentiveness to safely navigate the intersection without full functionality of the traffic light.

Accordingly, the present disclosure is directed, at least in part, to systems and methods for automatically managing updates to traffic control devices by tracking traffic flows, vehicle location, and vehicle speed and instructing a specific traffic control device from a network of traffic control devices to switch to an updated traffic control device component during an available time window to avoid impacting traffic flows during downtime of that specific traffic control device while implementing the update. In an implementation, a system includes a plurality of traffic control devices, sources of data for traffic control device location, vehicle location, and vehicle speed, and a controller to perform distance and time calculations to determine which traffic control devices are available to update without impacting traffic flow during the update period. The system issues update notifications to traffic control devices that are ready to receive updates and are available to do so without impacting traffic flow during the update period, where the notified traffic control devices receive the distributed update subsequent to receipt of the update notification (or receive authorization to switch to a previously-received update) and switch to the updated traffic control device component. In an implementation, the system determines that a specific traffic control device is authorized to receive an update or implement a previously-received update when a vehicle is outside of a minimum distance from the traffic control device during the pendency of downtime of the traffic control device to implement the update.

In an aspect, the present disclosure is directed, at least in part, to a railroad signal system configured to automatically distribute updates to railroad signal equipment and communications devices during a time period calculated to be available without impacting rail traffic flows. The railroad signal system includes a system to track location and speed of trains, a system to collect current signal and communication device statuses, a system that stores signal device locations, communications networks to distribute updates and collect data, and a processing system to calculate available time frames to switch signal and communications equipment to updated components, such as time frames where trains will not intercept the operable area of the signal and communication device during the update time period.

In an aspect, the present disclosure is directed, at least in part, to a traffic light system configured to automatically distribute updates to traffic light equipment and communications devices during a time period calculated to be available without impacting roadway traffic flows. The traffic light system includes a system to track location and speed of vehicles on the roadway, a system to collect current traffic light and communication device statuses, a system that stores traffic light locations, a processing system to calculate available time frames to switch traffic light controllers and communications devices to updated components, and a system to distribute updates to the traffic light controllers and communications devices for updating during the available time frames, such as time frames where vehicles on the roadway will not intercept the operable area of the traffic light equipment and communications devices during the update time period.

Example Implementations

Figure 2:
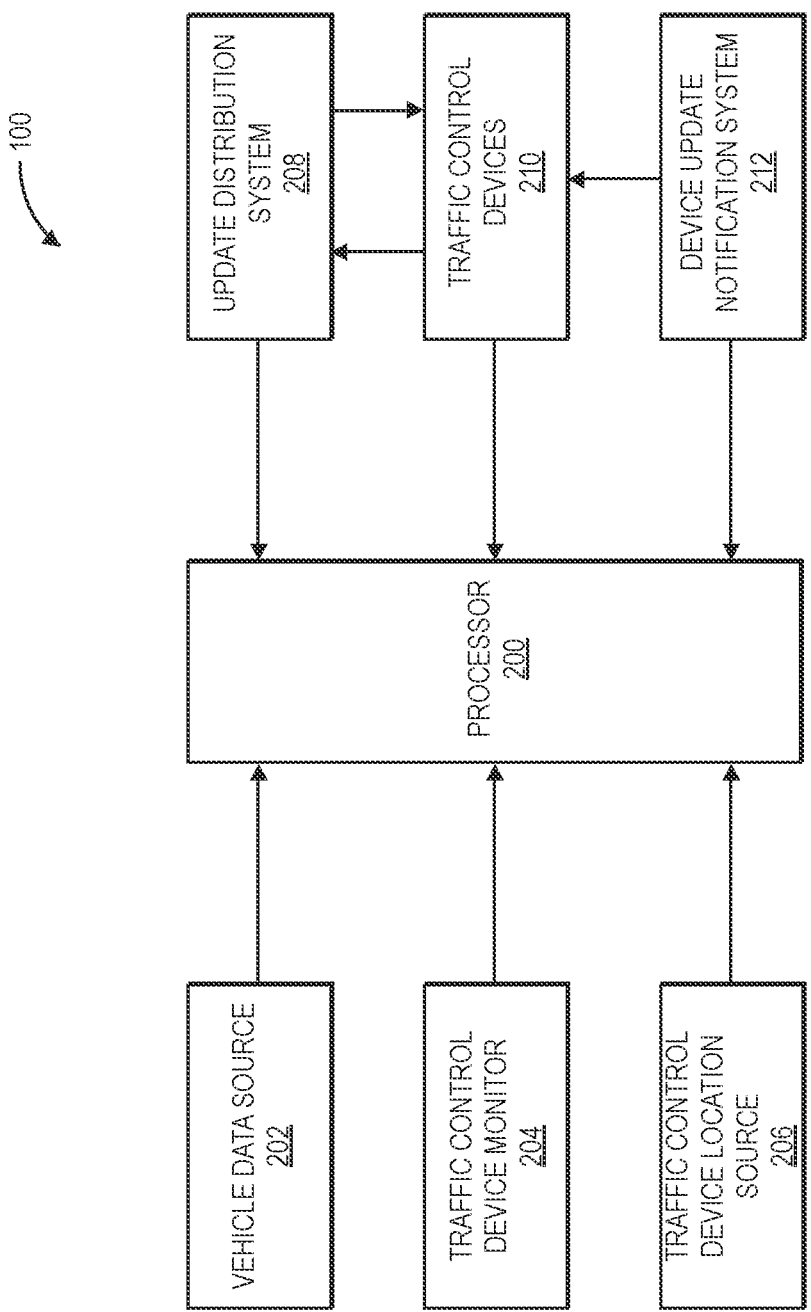
FIG. 2 is a schematic diagram of an implementation of the traffic control update system of FIG. 1.

Referring generally to FIGS. 1 and 2, a system 100 is provided for automatically managing updates to traffic control devices by instructing a specific traffic control device to switch to an updated traffic control device component during an available time window that avoids impacting traffic flows. As schematically shown in FIG. 1, a vehicle 102 traverses a travel path 104 that intercepts an operation zone 106 of a traffic control device 108. The vehicle 102 can include, but is not limited to, a train or other railroad vehicle (e.g., a Hi-Rail truck, etc.), an aircraft or other flight-based vehicle, a car, truck, motorcycle or other roadway vehicle, ship, boat, or other waterway vehicle, and the like. The operation zone 106 is an area where the traffic control device 108 can interact with the vehicle 102, such as by tracking the position of the vehicle 102 within the operation zone 106, providing a communication node to send information to and/or receive information from the vehicle 102 (e.g., to facilitate communications from a transportation traffic hub), control one or more operations of the vehicle 102, or the like, or combination thereof. For example, the operation zone 106 can include a geographical area or airspace over a geographical area that the traffic control device 108 has an ability to communicate with, or command, the vehicle 102 via remote communication protocols (e.g., one or more antennas or other communication systems).

The traffic control device 108 can include, but is not limited to, a wayside signal antenna operating on a railway, a traffic signal operating on a roadway or waterway, an air traffic antenna operating with respect to airspace, or the like. The traffic control device 108 is communicatively coupled with a system update controller 110 that manages updates to the traffic control device component of the traffic control device 108 (e.g., to update or alter operational capabilities of the traffic control device 108). For example, the traffic control device component can include software, firmware, or other structure to provide functionality for the traffic control device 108, where updates to the traffic control device component can include software updates, firmware updates, combinations thereof, or other updates.

The system update controller 110 manages data to determine whether the traffic control device 108 requires an update (or which traffic control devices of a group of traffic control devices require an update) and a time period over which the traffic control device 108 can implement the update while preventing a negative impact to traffic flow. For instance, the system update controller 110 can receive a status regarding the traffic control device 108 that indicates an outdated traffic control device component is installed in the traffic control device 108 when an updated traffic control device component is available. The system update controller 110 can then determine whether the traffic control device 108 can switch to the updated traffic control device component without impacting traffic flow, such as if the traffic control device 108 has one or more limits to operations due to implementing the updated traffic control device component (e.g., installing an update, resetting power, etc.). For example, the system update controller 110 can receive information associated with the location of the vehicle 102, which is shown in FIG. 1 as position 112, the speed of the vehicle 102 moving along the travel path 104, and the location of the traffic control device 108 or the location of the first area of reliable operation of the traffic control device 108 (e.g., a border of the operation zone 106 that intercepts the travel path 104 of the vehicle 102), which is shown in FIG. 1 as position 114. In implementations, the travel path 104 can be determined by one or more of a fixed infrastructure pathway (e.g., a fixed railway track, a paved road, an approved airspace for flight, etc.), a travel plan for the vehicle 102 accessible by the traffic control device 108 or other component of the system 100, or the like.

The system update controller 110 then determines a travel time period over which the vehicle 102 will travel between the position 112 and the position 114. For example, the system update controller 110 can determine a distance between the position 112 and the position 114 along the travel path 104 and estimate the speed of the vehicle 102 as a function of the current speed of the vehicle 102, a maximum speed of the vehicle 102 permitted along the travel path 104, or another measure, estimate, or calculation of speed to determine how much time is available before the vehicle 102 reaches the position 114. The system update controller 110 then compares the travel time period to an update time period during which the traffic control device 108 will switch to the updated traffic control device component before being operational with the updated traffic control device component. The update time period can include, for example, a period of time to execute the update (e.g., install updated software or firmware code) and to restart or power cycle the traffic control device 108, if appropriate, and can be dependent upon the type of hardware, software, and/or firmware installed in the traffic control device 108 and associated processing speeds, memory allocations, network communication bandwidths, and the like.

In implementations, if the travel time period over which the vehicle 102 will travel between the position 112 and the position 114 is greater than or equal to the update time period, the system update controller 110 can authorize the traffic control device 108 to receive and/or switch to the updated traffic control device component while ensuring the traffic control device 108 is operational once the vehicle 102 reaches the position 114. In implementations, the system update controller 110 authorizes the traffic control device 108 to receive and/or switch to the updated traffic control device component when the travel time period is greater than the update time period to provide a safety margin for switching to the updated traffic control device component prior to arrival of the vehicle 102 at the position 114. An example is described further herein with respect to FIG. 2.

Referring to FIG. 2, the system 100 is shown in accordance with example implementations of the present disclosure. The system 100 generally includes a processor 200, a vehicle data source 202, a traffic control device monitor 204, a traffic control device location source 206, an update distribution system 208, a plurality of traffic control devices 210 (e.g., a set of traffic control devices 108), and a device update notification system 212. The processor 200 is communicatively coupled with each of the vehicle data source 202, the traffic control device monitor 204, the traffic control device location source 206, the update distribution system 208, the plurality of traffic control devices 210, and the device update notification system 212 to receive and/or transmit communication directly or indirectly with the respective components. While the processor 200 is shown diagrammatically as a single box, the processor 200 is not limited to a single processor or to a single geographic area, where the processor 200 can be a plurality of computer processing devices communicatively coupled with each other via one or more communication networks to provide functionality of the processor 200 described herein. In implementations, one or more of the processor 200, the update distribution system 208, and the device update notification system 212 can be implemented as the system update controller 110 described with reference to FIG. 1.

In implementations, the processor 200 is communicatively coupled with the vehicle data source 202 to receive information associated with the vehicle 102 including, but not limited to, vehicle position, vehicle speed, vehicle type, vehicle size/weight, vehicle authorizations, and the like. In implementations, the vehicle data source 202 can provide additional or alternative data such as environmental conditions within the area managed by the system 100 (e.g., within the operation zone 106 of one or more traffic control devices 108) including, but not limited to, terrain conditions, weather conditions, traffic infrastructure conditions (e.g., bridge status, road status, rail status, airfield status, canal status, dock status, etc.), and the like. The vehicle data source 202 can include or be in communication with systems configured to determine the status of the vehicle 102 by tracking, measuring, storing, or otherwise determining vehicle data. For example, the vehicle data source 202 can include or be in communication with GPS sources to track the positioning of the vehicle, speed of the vehicle, etc., can include or be in communication with a computational network to track the positioning of the vehicle, speed of the vehicle, etc., or combinations thereof.

The processor 200 is communicatively coupled with the traffic control device monitor 204 to receive information associated with the status of one or more devices of the plurality of traffic control devices 210. For example, the status can include, but is not limited to, a vehicle presence detected at or near a traffic control device 210, a vehicle velocity, a vehicle location, a vehicle traffic control request, a vehicle control request, and the like. In implementations, the traffic control device monitor 204 can receive and transmit information associated with one or more of: an embedded metal detector in a lane of a roadway adjacent to a traffic signal (e.g., a turn lane); an image based vehicle detection system at an intersection; a railroad block occupancy detection system; a collection of GPS location, direction, and speed information provided by a train control system or a smart phone mapping application and traffic density function; a bus or public service vehicle request to a traffic signal to allow a vehicle to pass through an intersection; a train control system request for a current signal aspect; a train control system request to switch a rail position; a train control system request to block occupancy of a track or activation of grade crossing arms; a current status of vehicle autonomous operations such as a lead or trail position in a vehicle platoon; information associated with a lead or trail position in a train control system; a vehicle autonomous control state or train control state that implements or processes communications based upon traffic control information or grade crossing control information; or other information.

The statuses received via the traffic control device monitor 204 facilitate determinations by the system 100 of what features or components of the traffic control device 210 are available to go through the update process by switching to the new or updated version of that particular component. The traffic control device monitor 204 can maintain a database of statuses of the one or more devices of the plurality of traffic control devices 210, which can include a history of the status of the traffic control devices 210, a current status of the traffic control devices 210, a most recent status of the traffic control devices 210, etc. For example, the status can include current and historical versions of software, firmware, or hardware to determine whether the traffic control device is a candidate for an updated system component. In implementations, the traffic control device monitor 204 communicates directly with each of the traffic control devices 210 to determine a current status of each of the traffic control devices 210, communicates indirectly with each of the traffic control devices 210 via one or more intervening systems to determine a current status of each of the traffic control devices 210, or combinations thereof, where the statuses can be accessed or otherwise made available to the update distribution system 208 or other component of the system 100.

The processor 200 is communicatively coupled with the traffic control device location source 206 to receive information associated with the geographical positioning or relative positioning of the traffic control devices 210, such as for each traffic control device 210. The information received from the traffic control device location source 206 can be utilized by the processor 200 in calculations to determine absolute or relative distances between a given traffic control device 210 and a vehicle that is en route to the given traffic control device 210 or operational zone thereof.

The processor 200 is communicatively coupled with the update distribution system 208, to receive information associated with the updated traffic control device component and devices of the traffic control devices 210, such as identities of traffic control devices that are ready to switch to an updated traffic control device component, a time frame needed for a given traffic control device 210 to switch to the updated traffic control device component (e.g., an update time period), a version designation of the updated traffic control device component, and combinations thereof. The processor 200 can determine which devices of the traffic control devices 210 that are ready to switch are able to switch to the updated traffic control device component (e.g., candidate traffic control devices) without impacting travel flow. For instance, the processor 200 can determine a travel time period over which a vehicle 102 will reach a given traffic control device 210. For example, the processor 200 can determine a distance between the position of the vehicle 102 (e.g., provided by the vehicle data source 202) and the position of a given traffic control device 210 (e.g., provided by the traffic control device location source 206) along the travel path 104 and estimate the speed of the vehicle 102 as a function of the current speed of the vehicle 102, a maximum speed of the vehicle 102 permitted along the travel path 104, or another measure, estimate, or calculation of speed to determine how much time is available before the vehicle 102 reaches the position of a given traffic control device 210.

The processor 200 can compare the travel time period to the update time period (e.g., provided by the update distribution system 208) to determine whether the given traffic control device 210 will be operational with the updated traffic control device component before the vehicle 102 reaches the operation zone 106 of the given traffic control device 210. In implementations, if the travel time period is greater than or equal to the update time period, the processor 200 transmits the device information to the device update notification system 212 to authorize the given traffic control device 210 to switch to the updated traffic control device component. In implementations, the update time period includes the period of time required to download or otherwise transfer the updated traffic control device component to the given traffic control device 210.

Figure 4:
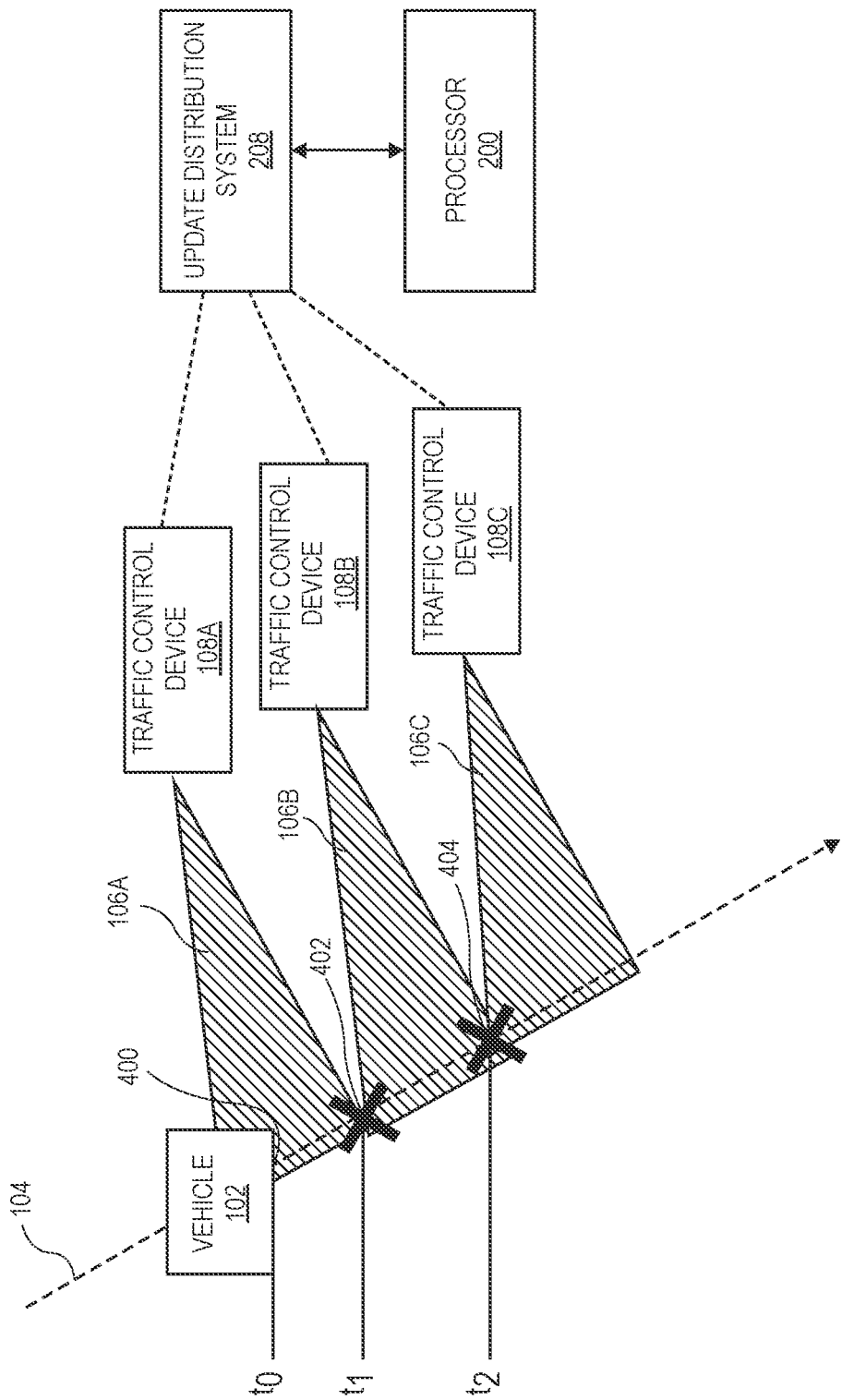
FIG. 4 is a schematic diagram of a traffic control update system for automatically determining traffic control devices suitable for switching to an updated traffic control device component based on proximity to vehicles that utilize the traffic control system in accordance with example implementations of the present disclosure.

An example determination by the processor 200 of candidate traffic control devices that are authorized to implement an updated traffic control device component is described with reference to FIG. 4. For instance, the travel path 104 is shown passing through three operational areas (labeled as 106A, 106B, 106C) monitored by three traffic control devices (labeled as 108A, 108B, 108C), respectively. In this example, the update distribution system 208 indicates that an updated traffic control device component is available at a moment when the vehicle 102 is within the operational area 106A of the traffic control device 108A (shown as to) at position 400. The processor 200 can receive information associated with the position of the vehicle 102 (e.g., via the vehicle data source 202), the position of each of the traffic control devices and/or the operational areas (e.g., via the traffic control device location source 206), and speed information associated with the vehicle (e.g., via the vehicle data source 202, via the traffic control device monitor 204, or combinations thereof) to assist in the determination of which, if any, of the traffic control devices are able to implement the updated traffic control device component without impacting the travel flow of the vehicle 102 along the travel path 104. Since the vehicle 102 is within the operational area 106A, the traffic control device 108A is not currently positioned to implement the updated traffic control device component. When the processor 200 receives information that the vehicle 102 has left the operation area 106A (e.g., at ti at position 402), the processor 200 may determine that the traffic control device 108A is authorized to implement the updated traffic control device component, provided that another vehicle would not enter operational area 106A during implementation of the update. In implementations, the processor 200 makes such determinations in real-time as the vehicle 102 travels along the travel path 104 to determine a precise moment when the traffic control device 108A is authorized to implement updated traffic control device component as the vehicle 102 leaves the operation area 106A.

When the vehicle 102 is at position 400, the processor 200 can determine whether the travel time along travel path 104 between position 400 and position 402 (e.g., the point at which the travel path 104 intercepts the operational area 106B) is less than or equal to the update time required for traffic control device 108B to implement the update. If the travel time is less than the update time, the processor 200 may determine that the traffic control device 108B is authorized to implement the updated traffic control device component, provided that another vehicle would not enter operational area 106A during implementation of the update. Similarly, the processor 200 can determine whether the travel time along travel path 104 between position 400 and position 404 (e.g., the point at which the travel path 104 intercepts the operational area 106C) is less than or equal to the update time required for traffic control device 108C to implement the update. If the travel time is less than the update time, the processor 200 may determine that the traffic control device 108C is authorized to implement the updated traffic control device component, provided that another vehicle would not enter operational area 106C during implementation of the update.

In implementations, the system 100 can transfer the updated traffic control device component to one or more traffic control devices 210, but delay installation or execution of the updated traffic control device component on a given traffic control device 210 until permitted by the system 100 during a time period that will not negatively impact traffic flows through the operational zone of the given traffic control device 210. In implementations, the updated traffic control device component is stored by the update distribution system 208, however the system 100 is not limited to such configuration and can make the updated traffic control device component available to the traffic control devices 210 from alternative or additional sources. Alternatively or additionally, the processor 200 can transmit to the device update notification system 212 a list of all devices that are authorized to switch to the updated traffic control device component. In implementations, the processor 200 transmits the device information or the update list to the device update notification system 212 to authorize the given traffic control device(s) 210 to switch to the updated traffic control device component when the travel time period is greater than the update time period or within a threshold time frame to provide a safety margin for switching to the updated traffic control device component prior to arrival of the vehicle 102 at the given traffic control device 210.

The device update notification system 212 communicates with the traffic control devices 210 to notify the traffic control devices 210 regarding the availability of one or more updated traffic control device components. In implementations, the device update notification system 212 provides an update notification to the devices that have been identified by the processor 200 as able to switch to the updated traffic control device component without impacting traffic flows. Alternatively or additionally, the device update notification system 212 provides the update notification to each of the traffic control devices 210. The traffic control devices 210 then communicate to the update distribution system 208 an indication that the given traffic control device 210 is ready to switch to the updated traffic control device component, whereby the update distribution system 208 communicates to the processor 200 a list of candidate devices ready to switch to the updated traffic control device component for determination of which candidate devices can switch to the updated traffic control device component without impacting traffic flows.

Figure 3:
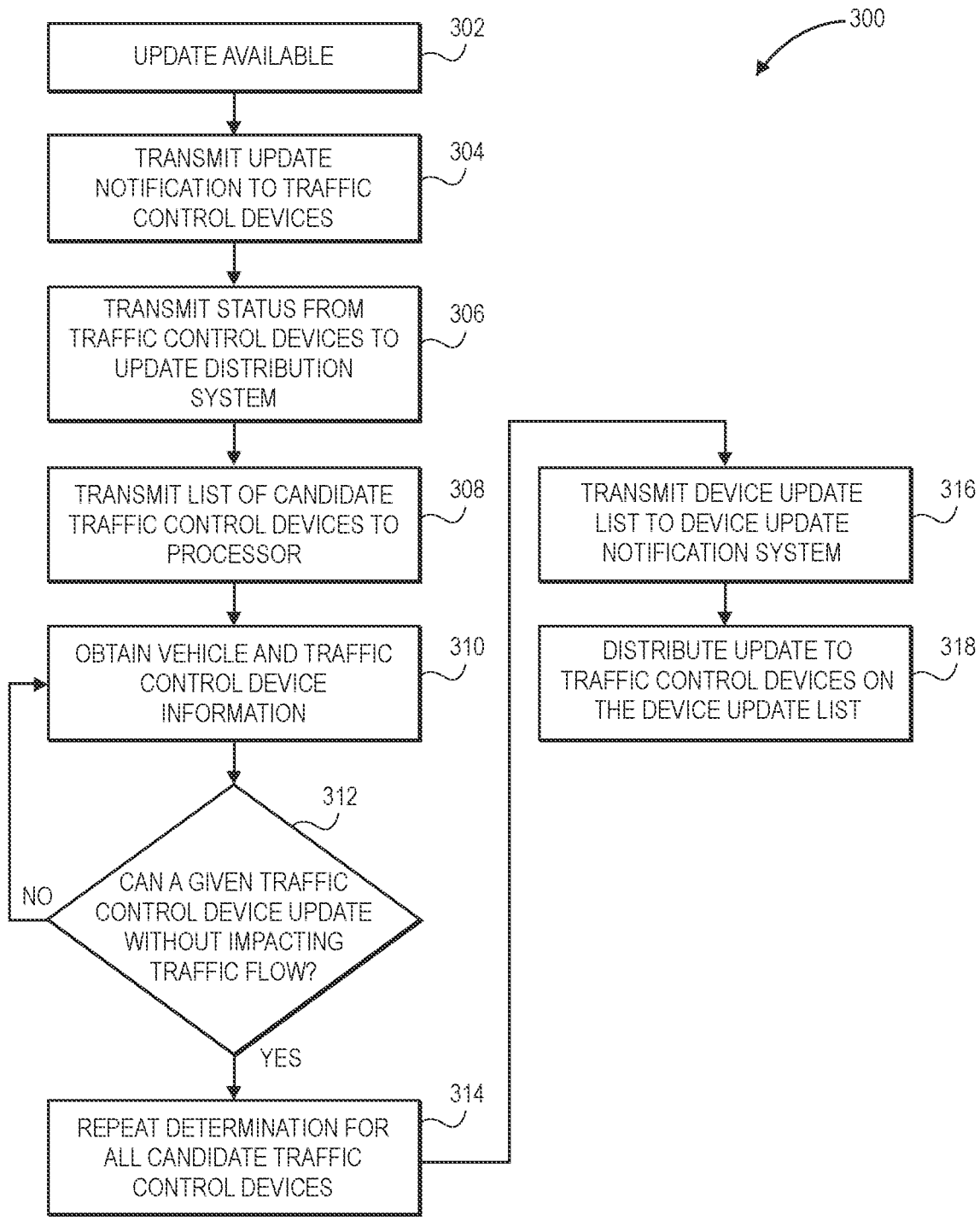
FIG. 3 is a flow diagram of a method for automatically determining traffic control devices suitable for switching to an updated traffic control device component based on proximity to vehicles that utilize the traffic control system in accordance with example implementations of the present disclosure.

Referring now to FIG. 3, a method 300 for automatically implementing updates to traffic control devices by instructing a specific traffic control device to switch to an updated traffic control device component during an available time window that avoids impacting traffic flows is described. The method 300 includes receiving an indication of an updated traffic control device component being available in block 302. For example, the update distribution system 208 can coordinate updates to software, firmware, combinations thereof, or other updates to functionality of the traffic control devices 210. The update or updated version of a traffic control device component can be loaded, installed, or otherwise made available to the update distribution system 208, which can generate an update notification to transmit or otherwise make available to components in the system 100. The method 300 then proceeds to block 304 where the update notification is transmitted to the traffic control devices 210. For example, the update notification system 208 can transmit the update notification to one or more of the traffic control devices 210. In implementations, the update notification system 208 transmits the update notification to each traffic control device 210 within a particular geographic region. In implementations, the update notification system 208 transmits the update notification to a subset of the traffic control devices 210 within a particular geographic region. In block 306, the traffic control devices transmit a status regarding readiness to switch to the updated traffic control device component. For example, the traffic control devices 210 can transmit a status to the update distribution system 208 indicating readiness to switch to the updated traffic control device component. In implementations, the readiness state or ready to switch status is based upon one or more of, a version of the software, firmware, or combinations thereof, currently installed in the traffic control devices 210, a power level of the traffic control devices 210, or another characteristic. For example, if a given traffic control device 210 already has the updated traffic control device component or is without sufficient power to operate, the traffic control device 210 will not indicate a ready to switch status.

The method 300 then proceeds to block 308 where a list of candidate traffic control devices is transmitted to the processor. For example, the update distribution system 208 can transmit a list of candidate devices (e.g., those traffic control devices that transmitted a ready to switch status to the update distribution system 208) to the processor 200 for determination of which traffic control devices 210 from the list of candidate devices are able to switch to the updated traffic control device component without impacting traffic flows of vehicles 102 operating in proximity of the traffic control devices 210. The method 300 also includes obtaining data from one or more data sources to determine which traffic control devices can switch to the updated traffic control device component without impacting traffic flows in block 310. For example, the processor 200 can receive data from the vehicle data source 202, the traffic control device monitor 204, the traffic control device location source 206, or combinations thereof, or other data sources to for use in the analysis of availability of specific traffic control devices 210 to switch to the update. The method further includes block 312, where it is determined whether a specific traffic control device is able to switch to the updated traffic control device component without impacting traffic flows. For example, the processor 200 can analyze the data received from the vehicle data source 202, the traffic control device monitor 204, the traffic control device location source 206, or combinations thereof, or other data sources to determine an available time frame for switching to the updated traffic control device component and compare that available time frame against the time used to implement the update (e.g., received from the update distribution system 208), as described herein. This determination is repeated (or performed in parallel) for all candidate traffic control devices in block 314. In implementations, the processor 200 performs the determination on a real time basis for each of the candidate traffic control devices 210.

The method 300 then proceeds to block 316, where a traffic control device update list is transmitted to the device update notification system. For example, the processor 200 can transmit to the device update notification system 212 the traffic control device update list containing one or more of the traffic control devices 210 identified as being able to switch to the updated traffic control device component without impacting traffic flows. The method 300 then proceeds to block 318, where the update is distributed to the traffic control devices 210 on the traffic control device update list for execution of switching to updated traffic control device component. In implementations, each traffic control device 210 on the traffic control device update list is authorized to request the updated traffic control device component from the update distribution system 208 for installation on the respective traffic control devices 210 on the traffic control device update list. Requests to receive the updated traffic control device component from unauthorized traffic control devices 210 (e.g., those not on the traffic control device update list) would either be denied by the system 100 (e.g., via the update distribution system 208 or the device update notification system 212) or would be permitted to transfer the update to the unauthorized but would be restricted from installing or otherwise changing to the updated traffic control device component until included on a traffic control device update list. Alternatively or additionally, the traffic control devices 210 can receive the update sooner, but are authorized to implement the switch following approval/identification by the processor 200 via inclusion on a traffic control device update list.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

The invention claimed is:

1. A system for automatically managing updates to traffic control devices, comprising:
    at least one traffic control device configured to control at least one aspect of travel of a vehicle traversing a travel path, the at least one traffic control device having an operational area intercepting at least a portion of the travel path, the at least one traffic control device including at least one traffic control device component stored in a memory device operable to provide functionality to the at least one traffic control device; and a system update controller communicatively coupled with the at least one traffic control device, the system update controller including at least one processor operable to receive an updated traffic control device component; determine whether the at least one traffic control device component stored in the memory device of the at least one traffic control device is an outdated version of the updated traffic control device component; and when it is determined that the at least one traffic control device component stored in the memory device of the at least one traffic control device is an outdated version of the updated traffic control device component, determine whether the at least one traffic control device can implement the updated traffic control device component prior to arrival of the vehicle at a point of the travel path that intercepts the operational area.

2. The system of claim 1, wherein the processor is further operable to instruct the at least one traffic control device to implement the updated traffic control device component when it is determined that the at least one traffic control device can implement the updated traffic control device component prior to arrival of the vehicle at the point of the travel path that intercepts the operational area.

3. The system of claim 1, wherein the processor is further operable to prevent the at least one traffic control device from implementing the updated traffic control device component when it is determined that the at least one traffic control device cannot implement the updated traffic control device component prior to arrival of the vehicle at the point of the travel path that intercepts the operational area.

4. The system of claim 1, wherein the processor is configured to determine whether the at least one traffic control device can implement the updated traffic control device component based at least upon a travel time of the vehicle prior to reaching the point of the travel path that intercepts the operational area.

5. The system of claim 4, wherein the processor is configured to determine the travel time of the vehicle based on a current speed of the vehicle, a position of the vehicle, and a position of the point of the travel path.

6. The system of claim 4, wherein the processor is configured to determine the travel time of the vehicle based on a maximum speed of the vehicle permitted along the travel path, a position of the vehicle, and a position of the point of the travel path.

7. The system of claim 4, wherein the processor is configured to compare the travel time of the vehicle to an update time period required for the at least one traffic control device to implement the updated traffic control device component.

8. The system of claim 7, wherein the processor is further operable to instruct the at least one traffic control device to implement the updated traffic control device component when it is determined that the travel time is greater than or equal to the update time period.

9. The system of claim 7, wherein the processor is further operable to instruct the at least one traffic control device to implement the updated traffic control device component when it is determined that the travel time is greater than the update time period.

10. The system of claim 1, wherein the at least one traffic control device includes a railroad wayside antenna, and wherein the travel path is formed by at least one railroad track.

11. The system of claim 1, wherein the at least one traffic control device includes a roadway traffic signal, and wherein the travel path is formed by at least one roadway.

12. A system for automatically managing updates to traffic control devices, comprising:
a plurality of traffic control devices configured to control at least one aspect of travel of a vehicle traversing a travel path, each traffic control device of the plurality of traffic control devices including at least one traffic control device component stored in a memory device operable to provide functionality to the traffic control device;
an update distribution system communicatively coupled with the plurality of traffic control devices, the update distribution system configured to
generate a notification of availability of an updated traffic control device component;
transmit the notification to the plurality of traffic control devices; and
generate a list of candidate traffic control devices from the plurality of traffic control devices that are ready to implement the updated traffic control device component; and
a processor communicatively coupled with the plurality of traffic control devices and the update distribution system, the processor configured to
receive the list of candidate traffic control devices;
determine which traffic control devices from the list of traffic control devices can implement the updated traffic control device component prior to arrival of the vehicle at a point of the travel path that intercepts an operational area of a traffic control device from the list of traffic control devices; and
generate a list of the traffic control devices that can implement the updated traffic control device component prior to arrival of the vehicle at the point of the travel path that are authorized to implement the updated traffic control device component,
wherein the traffic control devices on the list of the traffic control devices that can implement the updated traffic control device component are configured to implement the updated traffic control device component subsequent to authorization from the processor.

13. The system of claim 12, further comprising a device update notification system communicatively coupled with the processor and with the plurality of traffic control devices, wherein the processor is further configured to transmit the list of the traffic control devices that can implement the updated traffic control device component to the device update notification system.

14. The system of claim 13, wherein the device update notification system instructs the traffic control devices on the list of the traffic control devices to implement the updated traffic control device component.

15. The system of claim 12, wherein the processor is communicatively coupled with at least one of a vehicle data source, a traffic control device monitor, or a traffic control device location source, the processor configured to receive information from at least one of a vehicle data source, a traffic control device monitor, or a traffic control device location source to facilitate determination of which traffic control devices from the list of traffic control devices can implement the updated traffic control device component prior to arrival of the vehicle at the point of the travel path.

16. The system of claim 12, wherein the processor is configured to determine which traffic control devices from the list of traffic control devices can implement the updated traffic control device component prior to arrival of the vehicle at the point of the travel path based at least upon a travel time of the vehicle prior to reaching the point of the travel path that intercepts the operational area.

17. The system of claim 16, wherein the processor is configured to determine the travel time of the vehicle based on a current speed of the vehicle, a position of the vehicle, and a position of the point of the travel path.

18. The system of claim 16, wherein the processor is configured to determine the travel time of the vehicle based on a maximum speed of the vehicle permitted along the travel path, a position of the vehicle, and a position of the point of the travel path.

19. A method, comprising:
- generating, via an update distribution system, a notification of availability of an updated traffic control device component for at least one traffic control device component stored in a memory device of a plurality of traffic control devices configured to control at least one aspect of travel of a vehicle traversing a travel path;
- transmitting the notification to the plurality of traffic control devices;
- generating a list of candidate traffic control devices from the plurality of traffic control devices that are ready to implement the updated traffic control device component;
- receiving, via a computer processor, the list of candidate traffic control devices;
- determining, via the computer processor, which traffic control devices from the list of traffic control devices can implement the updated traffic control device component prior to arrival of the vehicle at a point of the travel path that intercepts an operational area of a traffic control device from the list of traffic control devices;
- generating a list of the traffic control devices that can implement the updated traffic control device component prior to arrival of the vehicle at the point of the travel path that are authorized to implement the updated traffic control device component; and
- implementing the updated traffic control device component on the traffic control devices on the list of the traffic control devices that can implement the updated traffic control device component prior to arrival of the vehicle at the point of the travel path subsequent to authorization from the processor.

20. The method of claim 19, wherein determining, via the computer processor, which traffic control devices from the list of traffic control devices can implement the updated traffic control device component prior to arrival of the vehicle at a point of the travel path that intercepts an operational area of a traffic control device from the list of traffic control devices includes:
- determining whether a travel time of the vehicle prior to reaching the point of the travel path that intercepts the operational area exceeds an update time period utilized to switch to the updated traffic control device component.

* * * * *